United States Patent
Shigeta et al.

(10) Patent No.: US 10,138,347 B2
(45) Date of Patent: Nov. 27, 2018

(54) METHOD FOR PRODUCING CARBON NANOTUBE DISPERSION LIQUID, CARBON NANOTUBE DISPERSION LIQUID, METHOD FOR PRODUCING COMPOSITE MATERIAL COMPOSITION, METHOD FOR PRODUCING COMPOSITE MATERIAL, COMPOSITE MATERIAL, AND COMPOSITE MATERIAL SHAPED PRODUCT

(71) Applicant: ZEON CORPORATION, Chiyoda-ku, Tokyo (JP)

(72) Inventors: Masahiro Shigeta, Tokyo (JP); Mitsugu Uejima, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 21 days.

(21) Appl. No.: 15/311,933

(22) PCT Filed: May 18, 2015

(86) PCT No.: PCT/JP2015/002489
§ 371 (c)(1),
(2) Date: Nov. 17, 2016

(87) PCT Pub. No.: WO2015/182058
PCT Pub. Date: Dec. 3, 2015

(65) Prior Publication Data
US 2017/0121178 A1    May 4, 2017

(30) Foreign Application Priority Data
May 30, 2014    (JP) .................................. 2014-113118

(51) Int. Cl.
*C01B 32/174*  (2017.01)
*B82Y 40/00*  (2011.01)
(Continued)

(52) U.S. Cl.
CPC ................ *C08K 3/04* (2013.01); *C01B 32/05* (2017.08); *C01B 32/168* (2017.08); *C08J 3/16* (2013.01);
(Continued)

(58) Field of Classification Search
CPC .......... C08J 3/215; B82Y 30/00; B82Y 40/00; C01B 31/0273; C01B 2202/32
(Continued)

(56) References Cited

U.S. PATENT DOCUMENTS

2010/0189628 A1* 7/2010 Schimpf ............... B82B 3/0076
423/447.2
2014/0353556 A1 12/2014 Shigeta et al.
(Continued)

FOREIGN PATENT DOCUMENTS

EP    1787955 A1    5/2007
EP    2653444 A1    10/2013
(Continued)

OTHER PUBLICATIONS

Dec. 6, 2017, Extended European Search Report issued by the European Patent Office in the corresponding European Patent Application No. 15800145.3.
(Continued)

*Primary Examiner* — Tri V Nguyen
(74) *Attorney, Agent, or Firm* — Kenja IP Law PC (57) ABSTRACT

Provided is a method for efficiently producing a carbon nanotube (CNT) dispersion liquid of highly dispersed CNTs while also suppressing damage to the CNTs. The method for producing a carbon nanotube dispersion liquid includes a dispersing step that includes at least one cycle of dispersing treatment in which pressure is applied to a coarse dispersion liquid containing carbon nanotubes and a dispersion medium, the coarse dispersion liquid is fed under pressure,
(Continued)

and shear force is applied to the coarse dispersion liquid such as to disperse the carbon nanotubes. A plurality of repetitions of the dispersing step are performed while altering the pressure that is applied to the coarse dispersion liquid. In at least one instance, the pressure applied to the coarse dispersion liquid is altered by at least 10 MPa between consecutive repetitions of the dispersing step.

5 Claims, 2 Drawing Sheets

(51) Int. Cl.
    *C08K 3/04*     (2006.01)
    *C08J 3/16*     (2006.01)
    *C08J 3/215*     (2006.01)
    *C08K 7/06*     (2006.01)
    *C08L 101/00*     (2006.01)
    *C01B 32/05*     (2017.01)
    *C01B 32/168*     (2017.01)
    *H01B 1/04*     (2006.01)

(52) U.S. Cl.
    CPC ............... *C08J 3/215* (2013.01); *C08K 7/06* (2013.01); *C08L 101/00* (2013.01); *C01B 2202/32* (2013.01); *C01B 2202/36* (2013.01); *C08J 2309/04* (2013.01); *C08K 2201/001* (2013.01)

(58) Field of Classification Search
    USPC .......................... 252/502, 511; 423/460, 461
    See application file for complete search history.

(56) References Cited

U.S. PATENT DOCUMENTS

| | | | |
|---|---|---|---|
| 2015/0295104 A1* | 10/2015 | Hankey | B01F 3/2078 252/514 |
| 2015/0368108 A1 | 12/2015 | Sone | |
| 2016/0020466 A1* | 1/2016 | Ulbrich | H01M 4/0404 429/217 |

FOREIGN PATENT DOCUMENTS

| | | |
|---|---|---|
| EP | 2787044 A1 | 10/2014 |
| EP | 2949624 A1 | 12/2015 |
| JP | 2006016222 A | 1/2006 |
| JP | 2010097794 A | 4/2010 |
| JP | 2010254546 A | 11/2010 |
| JP | 2013230951 A | 11/2013 |
| WO | 2006011655 A1 | 2/2006 |
| WO | 2013080912 A1 | 6/2013 |
| WO | 2014115560 A1 | 7/2014 |

OTHER PUBLICATIONS

Dec. 6, 2016, International Preliminary Report on Patentability issued in the International Patent Application No. PCT/JP2015/002489.

Aug. 4, 2015, International Search Report issued in the International Patent Application No. PCT/JP2015/002489.

Mar. 5, 2018, Office Action issued by the State Intellectual Property Office in the corresponding Chinese Patent Application No. 201580026336.8.

Qingbao Wei, Food Machinery and Equipment, Aug. 31, 2008, pp. 150-153, Chemical Industry Press.

Aug. 29, 2018, Communication pursuant to Article 94(3) EPC issued by the European Patent Office in the corresponding European Patent Application No. 15800145.3.

* cited by examiner

METHOD FOR PRODUCING CARBON NANOTUBE DISPERSION LIQUID, CARBON NANOTUBE DISPERSION LIQUID, METHOD FOR PRODUCING COMPOSITE MATERIAL COMPOSITION, METHOD FOR PRODUCING COMPOSITE MATERIAL, COMPOSITE MATERIAL, AND COMPOSITE MATERIAL SHAPED PRODUCT

TECHNICAL FIELD

The present disclosure relates to a method for producing a carbon nanotube dispersion liquid, a carbon nanotube dispersion liquid, a method for producing a composite material composition, a method for producing a composite material, a composite material, and a composite material shaped product. Specifically, the present disclosure relates to a method for producing a carbon nanotube dispersion liquid and to a carbon nanotube dispersion liquid obtained by this production method. Moreover, the present disclosure relates to a method for producing a composite material composition using this carbon nanotube dispersion liquid and to a method for producing a composite material using this composite material composition. Furthermore, the present disclosure relates to a composite material that is obtained by this method for producing a composite material and to a composite material shaped product that is formed using this composite material.

BACKGROUND

Composite materials in which a carbon material is blended with a polymer material, such as a resin or rubber, are conventionally used as materials having excellent electrical conductivity and mechanical characteristics. Moreover, in recent years, carbon nanotubes (hereinafter also referred to as "CNTs") have been attracting interest as a carbon material that is highly effective for improving electrical conductivity and mechanical characteristics. Among such CNTs, there is particular interest in the use single-walled carbon nanotubes (hereinafter also referred to as "single-walled CNTs") as a carbon material for a composite material. This is because single-walled CNTs are a fibrous conductive filler that exhibits high electrical conductivity and can favorably improve electrical conductivity and mechanical characteristics of composite materials even when the blending amount thereof is small.

In order to favorably improve electrical conductivity and mechanical characteristics of a composite material, it is necessary to homogeneously disperse a carbon material, such as CNTs, in a matrix of a polymer material. A technique has been proposed in which a composite material of CNTs homogeneously dispersed in a matrix of a polymer material is obtained by preparing a composite material composition through mixing of the polymer material and a carbon nanotube dispersion liquid in which the CNTs are homogeneously dispersed in a dispersion medium, and then using the composite material composition to produce the composite material.

However, CNTs such as single-walled CNTs tend to readily aggregate and become entangled with one another. Consequently, in production of composite materials using CNTs as a carbon material, there is demand for a technique that enables efficient production of a carbon nanotube dispersion liquid of homogeneously dispersed CNTs.

In response to this demand, PTL 1 for example proposes a technique in which shear force, shock waves, cavitation, or the like is used to break CNTs that are coarsely dispersed in a dispersion medium in order to obtain a carbon nanotube dispersion liquid in which the broken CNTs are highly dispersed. Moreover, PTL 2 for example proposes a technique in which aggregated CNTs in a dispersion medium are untangled and severed using an ultrasonic homogenizer in order to obtain a carbon nanotube dispersion liquid in which the CNTs are highly dispersed. Furthermore, PTLs 3 and 4 for example propose a technique in which a coarse dispersion liquid of CNTs coarsely dispersed in a dispersion medium is subjected to a plurality of cycles of dispersing treatment at a fixed treatment pressure using a jet mill in order to obtain a carbon nanotube dispersion liquid in which the CNTs are favorably dispersed, while also suppressing damage to the CNTs.

CITATION LIST

Patent Literature

PTL 1: JP 2006-16222 A
PTL 2: JP 2010-254546 A
PTL 3: JP 2013-230951 A
PTL 4: JP 2010-097794 A

SUMMARY

Technical Problem

However, the methods for producing a carbon nanotube dispersion liquid described in PTL 1 and 2 involve dispersing CNTs while actively breaking or severing the CNTs, and, as a result, the CNTs are significantly damaged during the dispersing treatment. Consequently, in some instances, composite materials produced using carbon nanotube dispersion liquids obtained through the techniques described in PTL 1 and 2 have not been able to exhibit the electrical conductivity and mechanical characteristics that are desired thereof.

Furthermore, with regards to the methods for producing a carbon nanotube dispersion liquid described in PTL 3 and 4 in which CNTs are dispersed through a plurality of cycles of dispersing treatment performed at a fixed treatment pressure using a jet mill, there is room for improvement in terms of more efficiently dispersing CNTs and increasing producibility of a carbon nanotube dispersion liquid of highly dispersed CNTs.

In view of the above, one objective of the present disclosure is to provide a method for efficiently producing a carbon nanotube dispersion liquid of highly dispersed CNTs while also suppressing damage to the CNTs.

Another objective of the present disclosure is to provide a carbon nanotube dispersion liquid produced by the aforementioned production method, and also to provide a method for producing a composite material composition and a method for producing a composite material using this carbon nanotube dispersion liquid.

Yet another objective of the present disclosure is to provide a composite material and composite material shaped product that have excellent electrical conductivity and mechanical characteristics.

Solution to Problem

The inventors conducted diligent investigation with the aim of achieving the objectives described above. As a result, the inventors discovered that by adopting a specific dispersing method and specific dispersing conditions with respect to a coarse dispersion liquid containing carbon nanotubes and a dispersion medium, it is possible to efficiently disperse the carbon nanotubes while also suppressing damage to the carbon nanotubes. This discovery led to the present disclosure.

Specifically, in order to advantageously solve the problems described above, one major feature of a presently disclosed method for producing a carbon nanotube dispersion liquid is that the method comprises a dispersing step including at least one cycle of dispersing treatment in which pressure is applied to a coarse dispersion liquid containing carbon nanotubes and a dispersion medium, the coarse dispersion liquid is fed under pressure, and shear force is applied to the coarse dispersion liquid such as to disperse the carbon nanotubes, wherein a plurality of repetitions of the dispersing step are performed while altering the pressure that is applied to the coarse dispersion liquid, and in at least one instance, the pressure applied to the coarse dispersion liquid is altered by at least 10 MPa between consecutive repetitions of the dispersing step. As a result of dispersing treatment being adopted in which the carbon nanotubes are dispersed by applying pressure to the coarse dispersion liquid, feeding the coarse dispersion liquid under pressure, and applying shear force to the coarse dispersion liquid, damage to the carbon nanotubes can be suppressed. Moreover, in the repetitions of the dispersing step, as a result of the pressure that is applied to the coarse dispersion liquid being altered from that of a directly preceding repetition of the dispersing step and as a result of there being at least one instance in which the pressure difference between consecutive repetitions of the dispersing step is at least 10 MPa, the carbon nanotubes can be highly dispersed in an efficient manner.

In the presently disclosed method for producing a carbon nanotube dispersion liquid, the carbon nanotubes preferably have an average diameter (Av) and a diameter standard deviation (σ) that satisfy a relationship $0.20<(3\sigma/Av)<0.60$. The reason for this is that carbon nanotubes for which $3\sigma/Av$ is greater than 0.20 and less than 0.60 are particularly effective for improving electrical conductivity and mechanical characteristics.

Herein, the "average diameter (Av) of carbon nanotubes" and the "diameter standard deviation (σ: sample standard deviation) of carbon nanotubes" can each be obtained by measuring the diameters (external diameters) of 100 randomly selected carbon nanotubes using a transmission electron microscope.

In the presently disclosed method for producing a carbon nanotube dispersion liquid, the carbon nanotubes preferably have a BET specific surface area of at least 600 $m^2/g$. The reason for this is that carbon nanotubes having a BET specific surface area of at least 600 $m^2/g$ are particularly effective for improving electrical conductivity and mechanical characteristics. Moreover, according to the presently disclosed production method, even carbon nanotubes having a BET specific surface area of 600 $m^2/g$ or greater can be highly dispersed in an efficient manner.

Herein, the term "BET specific surface area" refers to a nitrogen adsorption specific surface area that is measured by the BET method.

Moreover, in order to advantageously solve the problems described above, one major feature of a presently disclosed carbon nanotube dispersion liquid is that the carbon nanotube dispersion liquid is obtainable by any one of the methods for producing a carbon nanotube dispersion liquid that are described above. The carbon nanotube dispersion liquid produced by any of the above-described methods for producing a carbon nanotube dispersion liquid can be favorably used as a raw material for a composite material or the like because carbon nanotubes are highly dispersed therein and damage to these carbon nanotubes has been suppressed.

The above-described carbon nanotube dispersion liquid may be mixed with a polymer material-containing liquid, such as a latex, and be used in production of a composite material composition.

The composite material composition obtained as described above may be used in production of a composite material.

Moreover, a composite material obtained through solidification of the above-described composite material composition and a composite material shaped product obtained through shaping of this composite material can exhibit the performance desired thereof since carbon nanotubes to which damage has been suppressed are homogeneously dispersed therein.

Advantageous Effect

According to the present disclosure, it is possible to provide a method for efficiently producing a carbon nanotube dispersion liquid of highly dispersed CNTs while also suppressing damage to the CNTs.

Moreover, according to the present disclosure, it is possible to provide a carbon nanotube dispersion liquid that is produced by this production method, and also to provide a method for producing a composite material composition and a method for producing a composite material in which this carbon nanotube dispersion liquid is used.

Furthermore, according to the present disclosure, it is possible to provide a composite material and a composite material shaped product that have excellent electrical conductivity and mechanical characteristics.

DETAILED DESCRIPTION

The following provides a detailed description of embodiments of the present disclosure.

A presently disclosed method for producing a carbon nanotube dispersion liquid may be adopted in order to produce a carbon nanotube dispersion liquid in which CNTs are highly dispersed in a dispersion medium.

A carbon nanotube dispersion liquid that is produced by the presently disclosed method for producing a carbon nanotube dispersion liquid may for example be mixed with a polymer-containing liquid, such as a latex, and be used in production of a composite material composition. Alternatively, the carbon nanotube dispersion liquid may for example be used to form a conductive film in an as-produced state without being mixed with a latex or the like.

The aforementioned composite material composition may be used in production of a composite material. Moreover, the composite material may be shaped in accordance with the intended use thereof and be used in the form of a composite material shaped product.

(Method for Producing Carbon Nanotube Dispersion Liquid)

In the presently disclosed method for producing a carbon nanotube dispersion liquid, a coarse dispersion liquid that contains CNTs and a dispersion medium is subjected to a plurality of repetitions of a specific dispersing step to produce a carbon nanotube dispersion liquid in which the CNTs are highly dispersed in the dispersion medium. Specifically, the presently disclosed method for producing a carbon nanotube dispersion liquid includes a dispersing step including at least one cycle of dispersing treatment in which pressure is applied to a coarse dispersion liquid containing CNTs and a dispersion medium, the coarse dispersion liquid is fed under pressure, and shear force is applied to the coarse dispersion liquid, wherein a plurality of repetitions of the dispersing step are performed while altering the pressure that is applied to the coarse dispersion liquid in the dispersing treatment (hereinafter also referred to as the "applied pressure"). Furthermore, one major feature of the presently disclosed method for producing a carbon nanotube dispersion liquid is that when the dispersing step is performed repeatedly while altering the applied pressure of the dispersing treatment, there is at least one instance in which the size by which the applied pressure is altered between consecutive repetitions of the dispersing step is at least 10 MPa.

The following describes, in order, the coarse dispersion liquid that is used in production of the carbon nanotube dispersion liquid and a dispersing operation with respect to the carbon nanotubes in the coarse dispersion liquid.

<Coarse Dispersion Liquid>

The coarse dispersion liquid that is used in the presently disclosed method for producing a carbon nanotube dispersion liquid is a mixture containing CNTs and a dispersion medium. The coarse dispersion liquid can be obtained by adding the CNTs to the dispersion medium and optionally using a mixer or the like to mix the CNTs and the dispersion medium without applying pressure thereto. The coarse dispersion liquid is preferably prepared by a treatment method that minimizes damage to the CNTs.

The coarse dispersion liquid may optionally contain additives, such as a dispersant. Moreover, the coarse dispersion liquid may further contain carbon nanostructures other than CNTs.

[Carbon Nanotubes (CNTs)]

No specific limitations are placed on the CNTs that are dispersed in the coarse dispersion liquid. The CNTs may be single-walled carbon nanotubes, multi-walled carbon nanotubes, or a combination of both single-walled carbon nanotubes and multi-walled carbon nanotubes. From among these types of CNTs, the CNTs that are dispersed in the coarse dispersion liquid are preferably carbon nanotubes having from 1 to 5 walls, and are more preferably single-walled carbon nanotubes. The use of single-walled carbon nanotubes enables further improvement of electrical conductivity and mechanical characteristics of a composite material or the like produced using the carbon nanotube dispersion liquid, compared to a situation in which multi-walled carbon nanotubes are used.

The CNTs are preferably CNTs for which a ratio ($3\sigma/Av$) of the diameter standard deviation ($\sigma$) multiplied by 3 ($3\sigma$) relative to the average diameter (Av) is greater than 0.20 and less than 0.60, are more preferably CNTs for which $3\sigma/Av$ is greater than 0.25, and are further preferably CNTs for which $3\sigma/Av$ is greater than 0.50. The use of CNTs for which $3\sigma/Av$ is greater than 0.20 and less than 0.60 enables sufficient improvement of electrical conductivity and mechanical characteristics of a composite material or the like produced using the carbon nanotube dispersion liquid, even when the blending amount of the CNTs is small.

The average diameter (Av) and the standard deviation ($\sigma$) of the CNTs may be adjusted by changing the production method and the production conditions of the CNTs, or may be adjusted by combining a plurality of types of CNTs obtained by different production methods.

Herein, the CNTs that are used typically take a normal distribution when a plot is made of diameter measured as described above on a horizontal axis and probability density on a vertical axis, and a Gaussian approximation is made.

Furthermore, the CNTs preferably exhibit a radial breathing mode (RBM) peak when evaluated by Raman spectroscopy. Note that an RBM is not present in the Raman spectrum of a multi-walled carbon nanotube having three or more walls.

Moreover, in a Raman spectrum of the CNTs, a ratio (G/D ratio) of G band peak intensity relative to D band peak intensity is preferably at least 1 and no greater than 20. As a result of the G/D ratio being at least 1 and no greater than 20, electrical conductivity and mechanical characteristics of a composite material or the like produced using the carbon nanotube dispersion liquid can be sufficiently improved, even when the blending amount of the CNTs is small.

The average diameter (Av) of the CNTs is preferably at least 0.5 nm, and more preferably at least 1 nm, and is preferably no greater than 15 nm, and more preferably no greater than 10 nm. As a result of the average diameter (Av) of the CNTs being at least 0.5 nm, aggregation of the CNTs can be inhibited and the dispersibility of the CNTs can be increased. Moreover, as a result of the average diameter (Av) of the CNTs being no greater than 15 nm, electrical conductivity and mechanical characteristics of a composite material or the like produced using the carbon nanotube dispersion liquid can be sufficiently improved.

The average length of a structure of the CNTs at the time of synthesis is preferably at least 100 μm and no greater than 5,000 μm. Herein, through use of the presently disclosed method for producing a carbon nanotube dispersion liquid, it is possible to sufficiently suppress damage to the CNTs during dispersing even when CNTs are used for which the average length of the structure thereof at the time of synthesis is 100 μm or greater. CNTs that have a longer structure length at the time of synthesis tend to be more easily damaged by breaking, severing, or the like during dispersing. Therefore, it is preferable that the average length of the structure at the time of synthesis is no greater than 5,000 m.

The BET specific surface area of the CNTs is preferably at least 600 $m^2/g$, and more preferably at least 800 $m^2/g$, and is preferably no greater than 2,500 $m^2/g$, and more preferably no greater than 1,200 $m^2/g$. Moreover, in a situation in which the CNTs are mainly open CNTs, it is preferable that the BET specific surface area is at least 1,300 $m^2/g$. As a result of the BET specific surface area of the CNTs being at least 600 $m^2/g$, electrical conductivity and mechanical characteristics of a composite material or the like produced using the carbon nanotube dispersion liquid can be sufficiently improved. Moreover, as a result of the BET specific surface area of the CNTs being no greater than 2,500 $m^2/g$, aggregation of the CNTs can be inhibited and dispersibility of the CNTs can be increased.

The CNTs can be obtained on a substrate having a catalyst layer for carbon nanotube growth on the surface thereof through a super growth method described further below. The CNTs are obtained as an aggregate (aligned CNT aggregate) that is aligned roughly perpendicularly to the substrate. The mass density of the CNTs in the form of this aggregate is preferably at least 0.002 g/cm$^3$ and no greater than 0.2 g/cm$^3$. As a result of the mass density being no greater than 0.2 g/cm$^3$, the CNTs can be homogeneously dispersed since binding between the CNTs is weakened. Moreover, as a result of the mass density being at least 0.002 g/cm$^3$, the unity of the CNTs is improved, which prevents the CNTs from becoming unbound and makes the CNTs easier to handle.

The CNTs preferably include micropores. The micropores in the CNTs are preferably pores that have a pore diameter of smaller than 2 nm. The amount of these micropores, in terms of a micropore volume obtained by the method described below, is preferably at least 0.40 mL/g, more preferably at least 0.43 mL/g, and further preferably at least 0.45 mL/g, and normally has an upper limit of approximately 0.65 mL/g. As a result of the CNTs including micropores such as described above, aggregation of the CNTs can be inhibited, dispersibility of the CNTs can be increased, and a carbon nanotube dispersion liquid of highly dispersed CNTs can be obtained extremely efficiently. The micropore volume may for example be adjusted through appropriate alteration of the production method and the production conditions of the CNTs.

Herein, "micropore volume (Vp)" can be calculated from equation (I)—Vp=(V/22,414)×(M/ρ)—by measuring a nitrogen adsorption and desorption isotherm of the CNTs at liquid nitrogen temperature (77 K) and by setting an amount of adsorbed nitrogen at a relative pressure of P/P0=0.19 as V. It should be noted that P is a measured pressure at adsorption equilibrium, P0 is a saturated vapor pressure of liquid nitrogen at time of measurement, and, in equation (I), M is a molecular weight of 28.010 of the adsorbate (nitrogen), and ρ is a density of 0.808 g/cm$^3$ of the adsorbate (nitrogen) at 77 K. The micropore volume can for example be measured using a BELSORP®-mini (BELSORP is a registered trademark in Japan, other countries, or both) produced by Bel Japan Inc.

The CNTs having the properties described above can for example be produced efficiently by, in a method (super growth method; refer to WO 2006/011655) in which, during synthesis of the CNTs through chemical vapor deposition (CVD) by supplying a feedstock compound and a carrier gas onto a substrate having a catalyst layer for carbon nanotube production on the surface thereof, catalytic activity of the catalyst layer is dramatically improved by providing a trace amount of an oxidizing agent (catalyst activating material) in the system, forming the catalyst layer on the surface of the substrate through a wet process and using a feedstock gas having acetylene as a main component (for example, a gas containing at least 50 volume % of acetylene). Note that carbon nanotubes obtained by the super growth method are also referred to below as "SGCNTs".

[Dispersion Medium]

Examples of the dispersion medium in which the CNTs are dispersed include, but are not specifically limited to, aliphatic hydrocarbon solvents, aromatic hydrocarbon solvents, ether solvents, alcohol solvents, ester solvents, ketone solvents, mixed solvents of any of these solvents, and water. Moreover, a mixture of water and another solvent may be used as the dispersion medium.

Among the solvents listed above, solvents having a solubility parameter (SP) of at least 8 (cal/cm$^3$)$^{1/2}$ are preferable as the dispersion medium from a viewpoint of operability and CNT dispersibility. Moreover, the solvent used as the dispersion medium preferably has a solubility parameter of no greater than 26 (cal/cm$^3$)$^{1/2}$. Specific examples of solvents having a large solubility parameter that can be preferably used as the dispersion medium include water (23.4), 1-methyl-2-pyrrolidone (11.2), dimethylformamide (12.1), dimethyl sulfoxide (12.3), dimethylacetamide (10.8), toluene (8.9), methanol (14.5), tetrahydrofuran (9.1), ethyl acetate (9.1), acetonitrile (11.9), ethylene glycol (14.6), methyl isobutyl ketone (8.4), and butyl alcohol (11.4). Note that the number in parentheses indicates the value of the solubility parameter.

Herein, the "solubility parameter" is defined as the square root of cohesive energy density. The solubility parameter was proposed by Hildebrand and Scott based on regular solutions for which mixing causes a change of enthalpy but causes almost no change of entropy. The solubility parameters of representative solvents are provided in "Polymer Handbook 3rd Ed., Willey-Interscience, 1989".

[Additives]

No specific limitations are placed on additives that may be optionally blended into the coarse dispersion liquid and known additives such as a dispersant may be used.

The dispersant may for example be a known dispersant that can assist dispersion of the CNTs. Specifically, examples of aqueous dispersants that can be suitably used in a situation in which the dispersion medium contains water include surfactants and polysaccharides. Of these dispersants, a surfactant is more preferable and an anionic surfactant is particularly preferable. The reason for this is that such dispersants have excellent CNT dispersibility and applicability to composite materials. Examples of a non-aqueous dispersants that can be suitably used in a situation in which the dispersion medium is an organic solvent include π-conjugated polymers and polymers having an ethylene chain as a main chain. Of these dispersants, a polymer having an ethylene chain as a main chain (for example, polystyrene or sulfonated polyimide) is preferable in terms of ease of acquisition.

[Properties of Coarse Dispersion Liquid]

The amount of the CNTs in the coarse dispersion liquid is preferably at least 0.03 mass %, and more preferably at least 0.1 mass %, and is preferably no greater than 1.0 mass %, and more preferably no greater than 0.5 mass %. As a result of the amount of the CNTs in the coarse dispersion liquid being at least 0.03 mass %, productivity during production of a composite material shaped product or the like using the carbon nanotube dispersion liquid can be increased. Moreover, as a result of the amount of the CNTs in the coarse dispersion liquid being no greater than 1.0 mass %, dispersibility of the CNTs can be increased and damage due to contact between the CNTs during dispersing treatment can be suppressed.

In a situation in which a surfactant is blended into the coarse dispersion liquid as a dispersant, the concentration of the dispersant is preferably at least as high as the critical micelle concentration.

<Dispersion Operation of Carbon Nanotubes in Coarse Dispersion Liquid>

As described above, in the presently disclosed method for producing a carbon nanotube dispersion liquid, a carbon nanotube dispersion liquid in which CNTs are highly dispersed in a dispersion medium is produced by subjecting the coarse dispersion liquid to a plurality of repetitions of a dispersing step while altering the applied pressure of dispersing treatment. Moreover, in the presently disclosed method for producing a carbon nanotube dispersion liquid, when the dispersing step is performed repeatedly while altering the applied pressure, it is required that there is at least one instance in which the pressure applied to the coarse dispersion liquid is altered by at least 10 MPa between consecutive repetitions of the dispersing step.

[Dispersing Treatment]

The dispersing treatment that is performed at least once in each repetition of the dispersing step is treatment in which pressure is applied to the coarse dispersion liquid, the coarse dispersion liquid is fed under pressure, and shear force is applied to the coarse dispersion liquid such as to disperse the CNTs while also suppressing damage thereto. In the aforementioned dispersing treatment, application of pressure to the coarse dispersion liquid and feeding of the coarse dispersion liquid under pressure such as to apply shear force to the coarse dispersion liquid can for example be performed by causing high-speed flow of the coarse dispersion liquid by a freely selected method, such as by spraying the pressurized coarse dispersion liquid from a nozzle, and thereby causing collisions such as between fluid and fluid, and between fluid and a flow path wall. This dispersing treatment can be performed by using a freely selected dispersing device that can apply shear force to the coarse dispersion liquid in the manner described above. Examples of dispersing devices such as described above include a wet jet mill and a dispersing system 10 configured as shown in FIG. 2.

The wet jet mill may for example be a commercially available product such as a JN1000 (produced by JOKOH Co., Ltd.) or a NANOVATER B-ED (produced by Yoshida Kikai Co., Ltd.). On the other hand, the dispersing system 10 can for example be constructed using a system device that is commercially available as a BERYU SYSTEM PRO (produced by Beryu Corp.).

Figure 2:
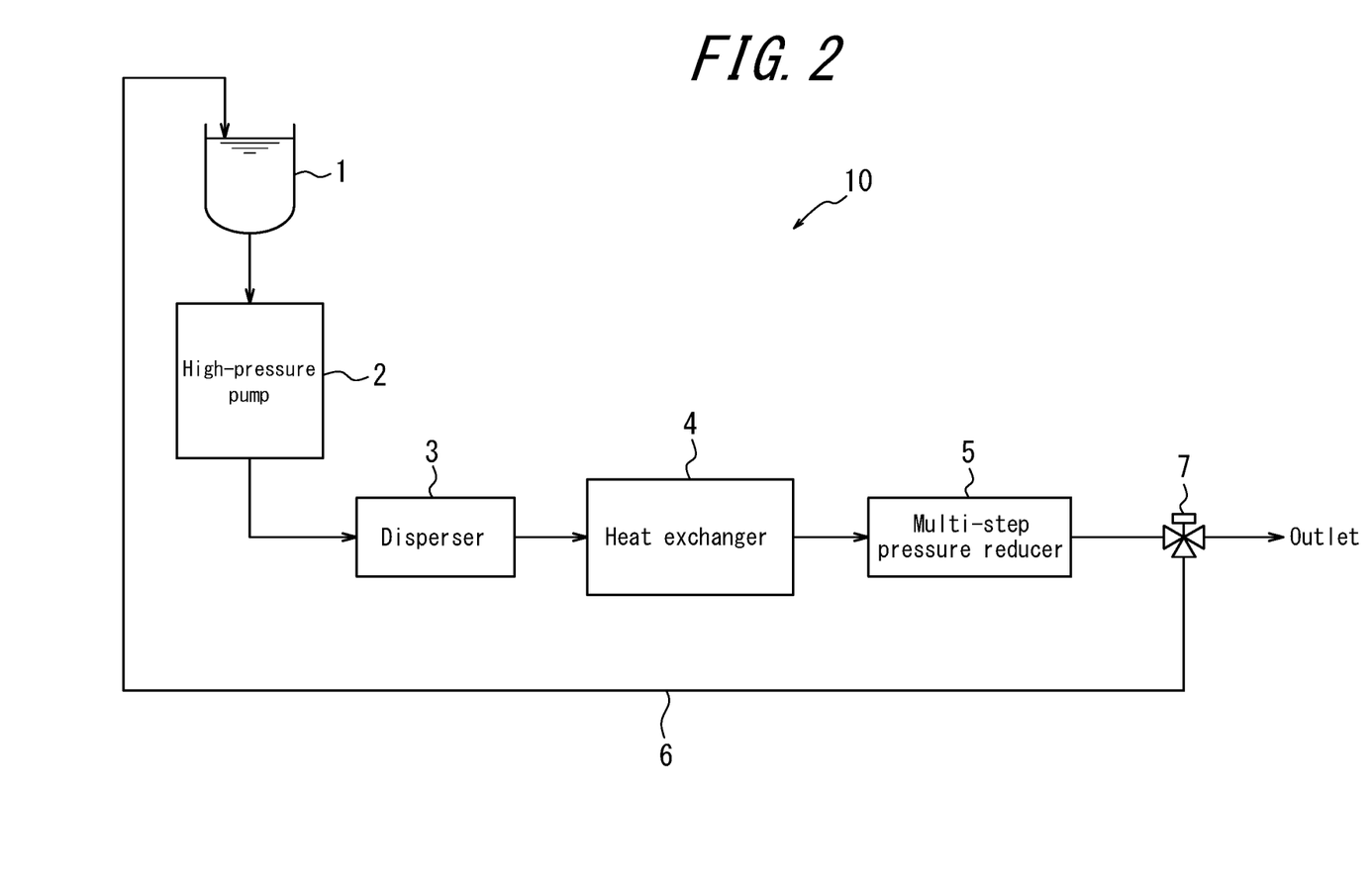
FIG. 2 illustrates an overview of configuration of one example of a dispersing system that can be adopted in a presently disclosed method for producing a carbon nanotube dispersion liquid.

The dispersing system 10 illustrated in FIG. 2 includes a tank 1 in which the coarse dispersion liquid is stored, a high-pressure pump 2 that applies pressure to the coarse dispersion liquid stored in the tank 1 and feeds the coarse dispersion liquid to a disperser 3 under pressure, and the disperser 3, which disperses the CNTs in the coarse dispersion liquid by applying shear force to the pressurized coarse dispersion liquid. The dispersing system 10 further includes a heat exchanger 4 for cooling the carbon nanotube dispersion liquid yielded by the disperser 3 and a multi-step pressure reducer 5 for reducing, multi-stepwise, the pressure (back pressure) of the carbon nanotube dispersion liquid cooled by the heat exchanger 4. The dispersion system 10 further includes a return line 6 for feeding, back to the tank 1, the carbon nanotube dispersion liquid that has been reduced in pressure by the multi-step pressure reducer 5 and a flow path switching valve (three-way valve) 7 for switching a flow path of the carbon nanotube dispersion liquid that has been reduced in pressure by the multi-step pressure reducer 5. In the dispersing system 10, the dispersion liquid can be loaded with a desired back pressure through the multi-step pressure reducer 5 and, as a result, it is possible to suppress formation of air bubbles in the dispersion liquid from occurring due to a reduction in pressure and to control elements of instability in the dispersing treatment (for example, the formation of air bubbles and the occurrence of turbulent flow due to lack of pressure control). Moreover, it is possible to suppress damage to the CNTs caused by cavitation (formation and bursting of air bubbles), and in particular damage to the CNTs caused by shock waves when air bubbles burst. Furthermore, in the dispersing system 10, the dispersing treatment can be repeated by using the flow path switching value (three-way value) 7 to switch the flow path of the carbon nanotube dispersion liquid.

The dispersing system 10 described above is obtained by adding the multi-step pressure reducer 5 to the aforementioned system device, which includes the tank 1, the high-pressure pump 2, the disperser 3, and the heat exchanger 4 described above. The dispersing system 10 may alternatively not include the multi-step pressure reducer 5. In a situation in which the multi-step pressure reducer 5 is not included in the dispersing system 10, the carbon nanotube dispersion liquid that has passed through the heat exchanger 4 is fed without alteration to the return line 6 or an outlet. It should be noted that the dispersing system 10 can be configured by replacing the aforementioned system device with a standard wet jet mill.

[Dispersing Step]

In each repetition of the dispersing step, the CNTs in the coarse dispersion liquid are dispersed by performing at least one cycle of the dispersing treatment described above. In a situation in which a plurality of cycles of the dispersing treatment are performed in each repetition of the dispersing step, the conditions of the dispersing treatment (for example, the pressure applied to the coarse dispersion liquid) remain the same during the same repetition of the dispersing step.

From a viewpoint of favorably dispersing the CNTs in the coarse dispersion liquid, the number of cycles of the dispersing treatment in each repetition of the dispersing step is preferably at least 3, more preferably at least 5, further preferably at least 8, and particularly preferably at least 10. Moreover, from a viewpoint of preventing damage to the CNTs, the number of cycles of the dispersing treatment in each repetition of the dispersing step is preferably no greater than 25.

Furthermore, from a viewpoint of favorably dispersing the CNTs in the coarse dispersion liquid, the applied pressure of the dispersing treatment in each repetition of the dispersing step is preferably at least 10 MPa. Also, from a viewpoint of preventing damage to the CNTs, the applied pressure of the dispersing treatment in each repetition of the dispersing step is preferably no greater than 100 MPa.

[Repetition of Dispersing Step]

In the presently disclosed method for producing a carbon nanotube dispersion liquid, when the carbon nanotube dispersion liquid is produced by repeatedly performing the dispersing step, the CNTs are efficiently dispersed by altering the applied pressure of the dispersing treatment between repetitions of the dispersing step and by altering the applied pressure by at least 10 MPa in at least one instance.

Figure 1:
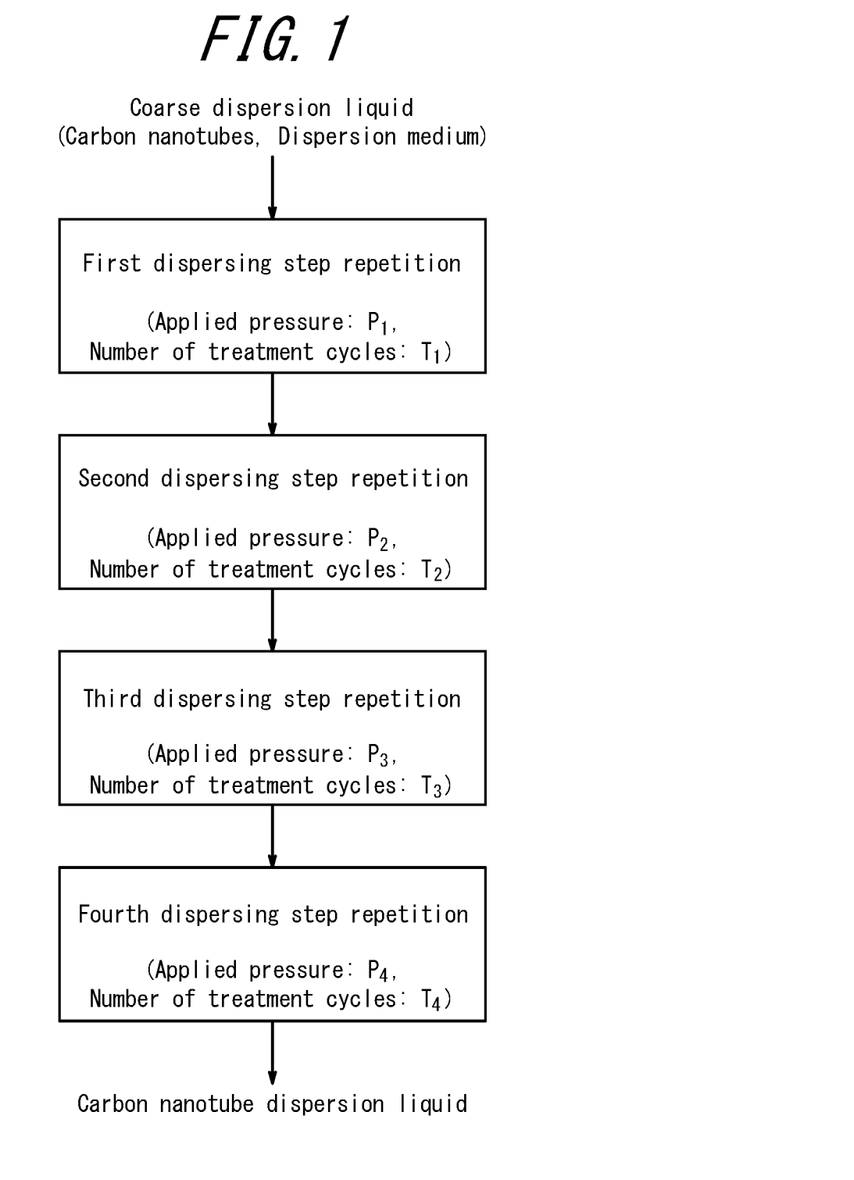
FIG. 1 is a flowchart for one example of a presently disclosed method for producing a carbon nanotube dispersion liquid.

Specifically, as illustrated in FIG. 1 by a flowchart of one example of the presently disclosed method for producing a carbon nanotube dispersion liquid, a carbon nanotube dispersion liquid is produced in this example of the presently disclosed method for producing a carbon nanotube dispersion liquid by performing, in order, with respect to a coarse dispersion liquid formed by a mixture of carbon nanotubes and a dispersion medium, a first dispersing step repetition in which $T_1$ cycles of the dispersing treatment are performed with an applied pressure $P_1$, a second dispersing step repetition in which $T_2$ cycles of the dispersing treatment are performed with an applied pressure $P_2$, a third dispersing step repetition in which $T_3$ cycles of the dispersing treatment are performed with an applied pressure $P_3$, and a fourth dispersing step repetition in which $T_4$ cycles of the dispersing treatment are performed with an applied pressure $P_4$. There is at least one instance in which the absolute value of the difference between applied pressures in consecutive repetitions of the dispersing step ($P_1-P_2$, $P_2-P_3$, or $P_3-P_4$) is at least 10 MPa.

Although the number of repetitions of the dispersing step can be freely selected so long as the number of repetitions is at least 2, from a viewpoint of efficiently dispersing the CNTs, the number of repetitions is preferably at least 3, and more preferably at least 4. However, from a viewpoint of preventing damage to the CNTs, it is preferable that the number of repetitions of the dispersing step is no greater than 10.

Although the reason that the CNTs can be efficiently dispersed as a result of the applied pressure being altered between repetitions of the dispersing step as described above has not yet been clarified, the reason is presumed to be as follows. Specifically, as a result of the applied pressure of the dispersing treatment being altered between the repetitions of the dispersing step, various sizes of shear force can be applied to the coarse dispersion liquid. Therefore, compared to a situation in which the dispersing treatment is performed repeatedly with a certain fixed applied pressure, the treatment pressure that is adopted is in accordance with progression of the dispersing and, as a result, the CNTs can be highly dispersed in an efficient manner. Moreover, as a result of there being at least one instance in which the applied pressure is altered by at least 10 MPa, the size of shear force and the mode of flow that arises within the device used to perform the dispersing treatment are significantly changed between repetitions of the dispersing step such that the CNTs can be efficiently dispersed.

From a viewpoint of significantly changing the shear force that is applied to the coarse dispersion liquid and further improving dispersibility of the CNTs and dispersing efficiency, the applied pressure is preferably altered by at least 20 MPa between consecutive repetitions of the dispersing step, and is more preferably altered by at least 40 MPa between consecutive repetitions of the dispersing step. However, from a viewpoint of limiting increased cost of pressure-resistant components of the device used to perform the dispersing treatment, the size by which the applied pressure is altered between repetitions of the dispersing step is preferably no greater than 120 MPa.

In a situation in which 3 or more repetitions of the dispersing step are performed in the presently disclosed method for producing a carbon nanotube dispersion liquid, it is preferable from a viewpoint of further improving dispersibility of the CNTs and dispersing efficiency that the applied pressure of the dispersing treatment is altered by at least 10 MPa between all consecutive repetitions of the dispersing step. In other words, in the example illustrated in FIG. 1, it is preferable that the absolute value of $P_1-P_2$, the absolute value of $P_2-P_3$, and the absolute value of $P_3-P_4$ are all at least 10 MPa.

Furthermore, in a situation in which 3 or more repetitions, and preferably 4 or more repetitions of the dispersing step are performed, it is preferable from a viewpoint of further improving CNT dispersing efficiency that the applied pressure of the dispersing treatment is altered between repetitions of the dispersing step by alternation between increasing and decreasing the applied pressure (i.e., in the example illustrated in FIG. 1, $P_1>P_2$, $P_2<P_3$, and $P_3>P_4$ or $P_1<P_2$, $P_2>P_3$, and $P_3<P_4$). As a result of the applied pressure being alternately increased and decreased between repetitions of the dispersing step, large and small shear forces are repeatedly applied, which enables effective dispersion of the CNTs.

Moreover, from a viewpoint of improving dispersing efficiency while also suppressing damage to the CNTs, it is preferable that in the final two repetitions of the dispersing step (for example, an $(n-1)^{th}$ repetition and an $n^{th}$ repetition of the dispersing step in a situation in which the dispersing step is performed n times), the final repetition of the dispersing step ($n^{th}$ repetition) is preferably performed after a directly preceding repetition of the dispersing step ($(n-1)^{th}$ repetition) that is performed with a higher applied pressure than the final repetition of the dispersing step. It is thought that a repetition of the dispersing step in which the applied pressure is relatively low serves to stabilize the dispersion state of the CNTs, whereas, if a repetition in which the applied pressure is relatively high is performed as the final repetition of the dispersing step, the dispersion state may be destabilized and thus the final dispersion state may once again return to a dispersion-deficient state. In a situation in which there is a return to a dispersion-deficient state, it is necessary to perform an additional repetition of the dispersing step with a low applied pressure for the purpose of re-stabilization, which leads to an unnecessary extension of treatment time and further damage to the CNTs.

Furthermore, from a viewpoint of suppressing damage to the CNTs, it is preferable that before performing a first repetition of the dispersing step, the dispersion medium and the optionally added dispersant are blended with the CNTs and optionally added carbon nanostructures (carbon nanostructures other than CNTs) in a mixer or the like. For example, the coarse dispersion liquid is preferably prepared by stirring the dispersion medium and the optionally added dispersant with the CNTs and so forth using a stirring blade or a magnetic stirrer. It is not necessary to apply pressure during preparation of the coarse dispersion liquid and if this operation is omitted, preparation of the coarse dispersion liquid (i.e., mixing of the CNTs, the dispersion medium, the optional dispersant, and so forth) actually occurs under an applied pressure, leading to an increase in the number of repetitions of the dispersing step that are performed and unnecessary damage to the CNTs.

(Carbon Nanotube Dispersion Liquid)

A carbon nanotube dispersion liquid obtained through the method for producing a carbon nanotube dispersion liquid described above has the CNTs highly dispersed in the dispersion medium and is normally in a homogeneous dispersion state in which visible aggregated lumps are not present. Moreover, damage to the carbon nanotubes in the carbon nanotube dispersion liquid obtained through the method for producing a carbon nanotube dispersion liquid described above has been suppressed. Therefore, the carbon nanotube dispersion liquid can be used in an as-produced state in formation of a conductive film or the like, or can be favorably used as a raw material for a composite material or the like. Note that the carbon nanotube dispersion liquid may further contain carbon nanostructures besides the CNTs.

(Method for Producing Composite Material Composition)

A presently disclosed method for producing a composite material composition includes a step of mixing a polymer material-containing liquid with the carbon nanotube dispersion liquid obtained by the above-described method for producing a carbon nanotube dispersion liquid. The composite material composition may be blended with various additives that are suitable for the intended use of a composite material produced with the composite material composition.

<Polymer Material-Containing Liquid>

When water or a mixture of water and another solvent is used as the dispersion medium of the carbon nanotube dispersion liquid, a latex can be suitably used as the polymer material-containing liquid.

The latex may be a latex of a polymer material that is suitable for the intended use of a composite material produced with the composite material composition. Specifically, the latex may be a rubber latex or a resin latex.

Examples of the rubber latex include, but are not specifically limited to, natural rubber latex and synthetic diene-based rubber latexes (for example, latexes of butadiene rubber, styrene-butadiene rubber, acrylonitrile-butadiene rubber, ethylene-vinyl acetate rubber, chloroprene rubber, vinyl pyridine rubber, and butyl rubber).

Examples of the resin latex include, but are not specifically limited to, latexes of styrene-based resin, acrylic resin, methacrylic resin, organic acid vinyl ester-based resin, vinyl ether-based resin, halogen-containing resin, olefinic resin, alicyclic olefinic resin, polycarbonate-based resin, polyester-based resin, polyamide-based resin, thermoplastic polyurethane resin, polysulfonic resin, polyphenylene ether-based resin, and silicone resin.

The latex may for example be prepared by the following methods.

(1) A method in which a solution of a resin or rubber dissolved in an organic solvent is emulsified in water in the presence of a surfactant, and the organic solvent is then removed as necessary to yield the latex (2) A method in which monomer molecules for forming a resin or rubber are emulsion polymerized or suspension polymerized to directly yield the latex Although no specific limitations are placed on the concentration of the polymer material component (solid content) in the latex, the concentration is preferably at least 20 mass % and no greater than 80 mass %, and more preferably at least 20 mass % and no greater than 60 mass % from a viewpoint of achieving homogeneous dispersion in the latex.

On the other hand, when an organic solvent is used as the dispersion medium of the carbon nanotube dispersion liquid, a polymer material solution obtained by dissolving a polymer material in an organic solvent can be suitably used as the polymer material-containing liquid. No specific limitations are placed on the polymer material solution other than being a solution that can mix with the carbon nanotube dispersion liquid without phase separation. The polymer material solution is appropriately prepared by a commonly known method.

Examples of the organic solvent of the polymer material solution include, but are not specifically limited to, 1-methyl-2-pyrrolidone, dimethylformamide, dimethyl sulfoxide, dimethylacetamide, toluene, cyclohexane, normal hexane, methanol, tetrahydrofuran, ethyl acetate, butyl acetate, acetonitrile, ethylene glycol, methyl isobutyl ketone, butyl alcohol, and 1-octanol.

Examples of the polymer material include, but are not specifically limited to, polystyrene, polyvinyl chloride, polyimide, polyacrylonitrile, polyvinyl pyrrolidone, polycarbonate, polyethylene terephthalate, cycloolefin polymer, and polymethyl methacrylate.

Although no specific limitations are placed on the concentration of the polymer material component (solid content) in the polymer material solution, the concentration is preferably at least 5 mass % and no greater than 30 mass %, and more preferably at least 8 mass % and no greater than 20 mass % from a viewpoint of appropriately maintaining the viscosity of the polymer material solution and ensuring favorable operability.

<Additives>

Examples of additives that can be used include, but are not specifically limited to, an antioxidant, a thermal stabilizer, a light stabilizer, an ultraviolet absorber, a crosslinking agent, a pigment, a coloring agent, a foaming agent, an antistatic agent, a flame retardant, a lubricant, a softener, a tackifier, a plasticizer, a mold release agent, a deodorizer, and a perfume.

These additives may be directly blended by melt-kneading or the like into a composite material produced from the composite material composition, without being blended into the composite material composition, so long as this does not impair expression of the desired effects disclosed herein.

<Production of Composite Material Composition>

The composite material composition may be obtained by mixing together the carbon nanotube dispersion liquid, the polymer material-containing liquid, and optional additives using a known stirring device such as a stirring blade, a magnetic stirrer, or a planetary mill.

From a viewpoint of homogeneously dispersing the CNTs in the composite material composition while preventing damage to the CNTs, it is preferable that the mixing time in mixing of the carbon nanotube dispersion liquid and the polymer material-containing liquid is at least 10 minutes and no greater than 24 hours.

The amount of the CNTs in the composite material composition relative to 100 parts by mass of the polymer material is preferably at least 0.01 parts by mass, more preferably at least 0.1 parts by mass, and further preferably at least 0.25 parts by mass, and is preferably no greater than 10 parts by mass, more preferably no greater than 7 parts by mass, and further preferably no greater than 5 parts by mass. As a result of the amount of the CNTs per 100 parts by mass of the polymer material being in the aforementioned range, the composite material produced with the composite material composition can be provided with adequate electrical conductivity and mechanical characteristics.

(Method for Producing Composite Material)

A presently disclosed method for producing a composite material includes a step of solidifying the composite material composition described above.

<Solidification of Composite Material Composition>

When a latex is used as the polymer material-containing liquid, the composite material composition may be solidified by any commonly known method for solidifying a latex. Specific examples of methods by which the composite material composition can be solidified to obtain the composite material include a method in which the composite material composition is added to a water-soluble organic solvent, a method in which an acid is added to the composite material composition, and a method in which a salt is added to the composite material composition.

The water-soluble organic solvent is preferably selected from solvents in which a dispersant dissolves and the polymer material contained in the composite material composition does not dissolve. Examples of such organic solvents include methanol, ethanol, 2-propanol, and ethylene glycol.

Examples of the acid include acids normally used for solidifying a latex such as acetic acid, formic acid, phosphoric acid, and hydrochloric acid.

Examples of the salt include commonly known salts that are normally used for solidifying a latex such as sodium chloride, aluminum sulfate, and potassium chloride.

On the other hand, when a polymer material solution is used as the polymer material-containing liquid, the composite material composition may be solidified by any re-precipitation or steam solidification method that is commonly known as a method for solidifying a polymer material.

The composite material obtained by solidifying the composite material composition contains CNTs that are homogeneously dispersed in a matrix of the polymer material and to which damage has been suppressed. The composite material may be optionally dried before being used as a material for a composite material shaped product.

(Composite Material Shaped Product)

The composite material shaped product may be obtained by shaping the above-described composite material using a shaping machine, such as an extruder, an injection molder, a compressor, or a roller, that corresponds to the shape of the desired shaped product. The composite material shaped product may optionally be subjected to crosslinking treatment.

The composite material shaped product obtained as described above contains CNTs that are homogeneously dispersed in a matrix of the polymer material and to which damage has been suppressed. This provides the composite material shaped product with excellent electrical conductivity and mechanical characteristics.

The composite material shaped product may for example be used as a material of a hose, a tire, an electromagnetic shield, or the like, but is not specifically limited to these uses.

EXAMPLES

The following provides a more specific explanation of the present disclosure based on examples. However, the present disclosure is not limited to the following examples.

Carbon nanotubes used in the examples and comparative examples were synthesized by a method described below. Furthermore, composite material shaped products that were produced were evaluated by a method described below.

(Synthesis of Carbon Nanotubes)

CNTs (SGCNTs-1) were prepared by the super growth method in accordance with the description in WO 2006/011655. In the preparation of the SGCNTs-1, formation of a catalyst layer on the surface of a substrate was performed by a wet process and a feedstock gas having acetylene as a main component was used.

The resultant SGCNTs-1 had a BET specific surface area of 1,050 m$^2$/g (closed), a micropore volume of 0.44 mL/g, and when measured using a Raman spectrophotometer, exhibited a radial breathing mode (RBM) spectrum in a low wavenumber region from 100 cm$^{-1}$ to 300 cm$^{-1}$, which is characteristic of single-walled CNTs. Moreover, as a result of measuring the diameters and the lengths of 100 randomly selected SGCNTs-1 using a transmission electron microscope, it was found that the average diameter (Av) was 3.3 nm, the diameter standard deviation ($\sigma$) multiplied by 3 ($3\sigma$) was 1.9 nm, the ratio ($3\sigma$/Av) thereof was 0.58, and the average length was 500 µm.

(Evaluation Method)

Measurement was performed as described below by a method in accordance with JIS K7194 using a low-resistivity meter (produced by Mitsubishi Chemical Analytech, Co., Ltd.; product name: Loresta®-GP MCP-T610 (Loresta is a registered trademark in Japan, other countries, or both)).

Four square test pieces of 10 mm×10 mm were cut out from a composite material shaped product having a thin-film disk shape and were used as measurement samples. A PSP probe was selected for the 4-pin probe of the low-resistivity meter. Each of the measurement samples was fixed onto an insulating board, the probe was applied against the measurement sample at a central position (position 5 mm vertically and 5 mm laterally), and the electrical conductivity was measured while applying a voltage of 10 V. The electrical conductivities of the four measurement samples were measured and the average thereof was defined as the electrical conductivity of the composite material shaped product.

Example 1

After 10 g of the SGCNTs-1 and 100 g of sodium lauryl sulfate used as a dispersant had been added to 9.89 kg of water, stirring was performed using a mixer to yield a coarse dispersion liquid. The resultant coarse dispersion liquid was loaded into a wet jet mill (produced by JOKOH Co., Ltd.; product name: JN1000) and was subjected to first to fourth dispersing step repetitions under the dispersing treatment conditions shown below to yield a carbon nanotube dispersion liquid 1. The carbon nanotube dispersion liquid 1 was a homogeneous dispersion liquid that did not include visually identifiable particles.

First dispersing step repetition (applied pressure $P_1$: 90 MPa; number of treatment cycles $T_1$: 15)

Second dispersing step repetition (applied pressure $P_2$: 45 MPa; number of treatment cycles $T_2$: 15)

Third dispersing step repetition (applied pressure $P_3$: 90 MPa; number of treatment cycles $T_3$: 15)

Fourth dispersing step repetition (applied pressure $P_4$: 45 MPa; number of treatment cycles $T_4$: 10)

Example 2

A carbon nanotube dispersion liquid 2 was obtained in the same way as in Example 1 with the exception that 100 g of Tween 80 was used as the dispersant instead of sodium lauryl sulfate, the blending amount of the SGCNTs-1 was changed to 5 g, and first to fourth dispersing step repetitions were carried out under the dispersing treatment conditions shown below. The carbon nanotube dispersion liquid 2 was a homogeneous dispersion liquid that did not include visually identifiable particles.

First dispersing step repetition (applied pressure $P_1$: 100 MPa; number of treatment cycles $T_1$: 20)

Second dispersing step repetition (applied pressure $P_2$: 40 MPa; number of treatment cycles $T_2$: 25)

Third dispersing step repetition (applied pressure $P_3$: 80 MPa; number of treatment cycles $T_3$: 10)

Fourth dispersing step repetition (applied pressure $P_4$: 30 MPa; number of treatment cycles $T_4$: 8)

Example 3

A carbon nanotube dispersion liquid 3 was obtained in the same way as in Example 1 with the exception that the blending amount of water was changed to 9.88 kg, 20 g of multi-walled carbon nanotubes (produced by NanoIntegris Inc.; product name: HiPco; BET specific surface area: 450 m$^2$/g; RBM spectrum: observed at 100 cm$^{-1}$ to 300 cm$^{-1}$; average diameter (Av): 1.1 nm; diameter standard deviation ($\sigma$) multiplied by 3 ($3\sigma$): 0.2 nm; ratio ($3\sigma$/Av): 0.18) was used instead of the SGCNTs-1, and first to fourth dispersing step repetitions were carried out under the dispersing treatment conditions shown below. The carbon nanotube dispersion liquid 3 was a homogeneous dispersion liquid that did not include visually identifiable particles.

First dispersing step repetition (applied pressure $P_1$: 70 MPa; number of treatment cycles $T_1$: 10)

Second dispersing step repetition (applied pressure $P_2$: 50 MPa; number of treatment cycles $T_2$: 20)

Third dispersing step repetition (applied pressure $P_3$: 70 MPa; number of treatment cycles $T_3$: 8)

Fourth dispersing step repetition (applied pressure $P_4$: 45 MPa; number of treatment cycles $T_4$: 5)

Example 4

A carbon nanotube dispersion liquid 4 was obtained in the same way as in Example 1 with the exception that first to fifth dispersing step repetitions were carried out under the dispersing treatment conditions shown below. The total number of treatment cycles in the first to fifth dispersing step repetitions was the same (55 cycles) as the total number of treatment cycles in Example 1. The carbon nanotube dispersion liquid 4 was a homogeneous dispersion liquid that did not include visually identifiable particles.

First dispersing step repetition (applied pressure $P_1$: 45 MPa; number of treatment cycles $T_1$: 15)
Second dispersing step repetition (applied pressure $P_2$: 90 MPa; number of treatment cycles $T_2$: 15)
Third dispersing step repetition (applied pressure $P_3$: 45 MPa; number of treatment cycles $T_3$: 5)
Fourth dispersing step repetition (applied pressure $P_4$: 90 MPa; number of treatment cycles $T_4$: 10)
Fifth dispersing step repetition (applied pressure $P_5$: 45 MPa; number of treatment cycles $T_5$: 10)

Example 5

A carbon nanotube dispersion liquid 5 was obtained in the same way as in Example 1 with the exception that first to sixth dispersing step repetitions were carried out under the dispersing treatment conditions shown below. The total number of treatment cycles in the first to sixth dispersing step repetitions was the same (55 cycles) as the total number of treatment cycles in Example 1. The carbon nanotube dispersion liquid 5 was a homogeneous dispersion liquid that did not include visually identifiable particles.

First dispersing step repetition (applied pressure $P_1$: 15 MPa; number of treatment cycles $T_1$: 10)
Second dispersing step repetition (applied pressure $P_2$: 60 MPa; number of treatment cycles $T_2$: 15)
Third dispersing step repetition (applied pressure $P_3$: 90 MPa; number of treatment cycles $T_3$: 10)
Fourth dispersing step repetition (applied pressure $P_4$: 45 MPa; number of treatment cycles $T_4$: 5)
Fifth dispersing step repetition (applied pressure $P_5$: 10 MPa; number of treatment cycles $T_5$: 10)
Sixth dispersing step repetition (applied pressure $P_6$: 20 MPa; number of treatment cycles $T_6$: 5)

Example 6

A polystyrene solution was obtained by dissolving polystyrene (Wako Pure Chemical Industries, Ltd.; weight-average molecular weight: 73,000; weight-average molecular weight/number-average molecular weight: 3.8) in dimethylacetamide (DMAc) such as to have a concentration of 10 mg/mL. A coarse dispersion liquid was then obtained by stirring 5 g of the SGCNTs-1 and 10 L of the polystyrene solution for 2 hours in a tightly sealed container. The resultant coarse dispersion liquid was loaded into a wet jet mill (produced by JOKOH Co., Ltd.; product name: JN1000) and was subjected to first to fourth dispersing step repetitions under the dispersing treatment conditions shown below to yield a carbon nanotube dispersion liquid 6. The carbon nanotube dispersion liquid 6 was a homogeneous dispersion liquid that did not include visually identifiable particles.

First dispersing step repetition (applied pressure $P_1$: 90 MPa; number of treatment cycles $T_1$: 15)
Second dispersing step repetition (applied pressure $P_2$: 40 MPa; number of treatment cycles $T_2$: 10)
Third dispersing step repetition (applied pressure $P_3$: 75 MPa; number of treatment cycles $T_3$: 15)
Fourth dispersing step repetition (applied pressure $P_4$: 25 MPa; number of treatment cycles $T_4$: 12)

Example 7

A composite material composition was obtained by mixing 10 g of the carbon nanotube dispersion liquid 1 obtained in Example 1 and 495 mg of acrylonitrile-butadiene rubber latex (produced by ZEON Corporation; product name: Nipol® 1561 (Nipol is a registered trademark in Japan, other countries, or both)) in a beaker using a magnetic stirrer. The resultant composite material composition was poured into 50 mL of stirred 2-propanol to solidify a black crumb-form composite material. Thereafter, the composite material was collected from the 2-propanol by suction filtration and was dried by heating under reduced pressure (40° C., 18 hours) to yield 197 mg of a composite material 1 (SGCNT-rubber composite). The composite material 1 was a flexible and rubbery substance.

Next, the produced composite material 1 was subjected to vacuum press shaping under a vacuum with conditions of a temperature of 120° C., a pressure of 0.4 MPa, and a pressurizing time of 5 minutes to form a composite material shaped product 1 having a thin-film disk shape of approximately 40 mm to 60 mm in diameter and 100 µm to 500 µm in thickness. The electrical conductivity of the resultant composite material shaped product 1 was measured to be 2.7 S/cm.

Example 8

A composite material 2 (SGCNT-rubber composite) and a composite material shaped product 2 having a thin-film disk shape were obtained in the same way as in Example 7 with the exception that 20 g of the carbon nanotube dispersion liquid 2 obtained in Example 2 was used instead of the carbon nanotube dispersion liquid 1, and the amount of 2-propanol that was used was changed to 100 mL. The amount of the resultant composite material 2 was 192 mg. The composite material 2 was a flexible and rubbery substance.

The electrical conductivity of the resultant composite material shaped product 2 was measured to be 2.5 S/cm.

Example 9

A composite material 3 (multi-walled CNT-rubber composite) and a composite material shaped product 3 having a thin-film disk shape were obtained in the same way as in Example 7 with the exception that 5 g of the carbon nanotube dispersion liquid 3 obtained in Example 3 was used instead of the carbon nanotube dispersion liquid 1, and the amount of 2-propanol that was used was changed to 25 mL. The amount of the resultant composite material 3 was 185 mg. The composite material 3 was a flexible and rubbery substance.

The electrical conductivity of the resultant composite material shaped product 3 was measured to be 0.23 S/cm.

Example 10

A composite material 4 (SGCNT-rubber composite) and a composite material shaped product 4 having a thin-film disk shape were obtained in the same way as in Example 7 with the exception that the carbon nanotube dispersion liquid 4 obtained in Example 4 was used instead of the carbon nanotube dispersion liquid 1. The amount of the resultant composite material 4 was 195 mg. The composite material 4 was a flexible and rubbery substance.

The electrical conductivity of the resultant composite material shaped product 4 was measured to be 2.5 S/cm.

Example 11

A composite material 5 (SGCNT-rubber composite) and a composite material shaped product 5 having a thin-film disk shape were obtained in the same way as in Example 7 with the exception that the carbon nanotube dispersion liquid 5 obtained in Example 5 was used instead of the carbon nanotube dispersion liquid 1. The amount of the resultant composite material 5 was 192 mg. The composite material 5 was a flexible and rubbery substance.

The electrical conductivity of the resultant composite material shaped product 5 was measured to be 2.4 S/cm.

Example 12

Additional polystyrene was dissolved in the carbon nanotube dispersion liquid 6 obtained in Example 6 in order to increase the polystyrene concentration to 50 mg/mL. The resultant liquid was dripped into a stirred acetone solution to cause solidification of a composite material. Liquid content and solid content (composite material) were separated on a metal mesh. Thereafter, the solid content was dried for 18 hours under reduced pressure at 40° C. to obtain a composite material 6. The composite material 6 was a hard, black solid of undefined structure. This solid was hot pressed in a mold to obtain a composite material shaped product 6 measuring 3 cm×3 cm and having a thickness of 2 mm. The electrical conductivity of the resultant composite material shaped product 6 was measured to be 0.0004 S/cm.

Comparative Example 1

A coarse dispersion liquid prepared in the same way as in Example 1 was loaded into a wet jet mill (produced by JOKOH Co., Ltd.; product name: JN1000) and 200 cycles of dispersing treatment were performed at a fixed applied pressure of 90 MPa to obtain a comparative example carbon nanotube dispersion liquid 1. Although aggregates of the SGCNTs-1 in the resultant comparative example carbon nanotube dispersion liquid 1 were finer than at the start of dispersing, a large number of visually identifiable particles were present in the liquid and an India ink-like homogeneous solution was not obtained.

Comparative Example 2

A comparative example carbon nanotube dispersion liquid 2 was obtained in the same way as in Example 1 with the exception that first to fourth dispersing step repetitions were carried out under the dispersing treatment conditions shown below. Although aggregates of the SGCNTs-1 in the resultant comparative example carbon nanotube dispersion liquid 2 were finer than at the start of dispersing, a large number of visually identifiable particles were present in the liquid even after completion of the fourth dispersing step repetition and an India ink-like homogeneous solution was not obtained.

First dispersing step repetition (applied pressure $P_1$: 50 MPa; number of treatment cycles $T_1$: 15)

Second dispersing step repetition (applied pressure $P_2$: 45 MPa; number of treatment cycles $T_2$: 15)

Third dispersing step repetition (applied pressure $P_3$: 50 MPa; number of treatment cycles $T_3$: 15)

Fourth dispersing step repetition (applied pressure $P_4$: 45 MPa; number of treatment cycles $T_4$: 10)

Comparative Example 3

A comparative example composite material 1 (SGCNT-rubber composite) and a comparative example composite material shaped product 1 having a thin-film disk shape were obtained in the same way as in Example 7 with the exception that the comparative example carbon nanotube dispersion liquid 1 obtained in Comparative Example 1 was used instead of the carbon nanotube dispersion liquid 1. The amount of the resultant comparative example composite material 1 was 189 mg. The comparative example composite material 1 was a flexible and rubbery substance.

The electrical conductivity of the resultant comparative example composite material shaped product 1 was below the measurement limit ($10^{-7}$ S/cm) when measured.

Comparative Example 4

A comparative example composite material 2 (SGCNT-rubber composite) and a comparative example composite material shaped product 2 having a thin-film disk shape were obtained in the same way as in Comparative Example 3 with the exception that the comparative example carbon nanotube dispersion liquid 2 obtained in Comparative Example 2 was used instead of the comparative example carbon nanotube dispersion liquid 1. The amount of the resultant comparative example composite material 2 was 181 mg. The comparative example composite material 2 was a flexible and rubbery substance.

The electrical conductivity of the resultant comparative example composite material shaped product 2 was below the measurement limit ($10^{-7}$ S/cm) when measured.

INDUSTRIAL APPLICABILITY

According to the present disclosure, it is possible to provide a method for efficiently producing a carbon nanotube dispersion liquid of highly dispersed CNTs while also suppressing damage to the CNTs.

Moreover, according to the present disclosure, it is possible to provide a carbon nanotube dispersion liquid produced by this production method, and also a method for producing a composite material composition and a method for producing a composite material in which this carbon nanotube dispersion liquid is used.

Furthermore, according to the present disclosure, it is possible to provide a composite material and a composite material shaped product having excellent electrical conductivity and mechanical characteristics.

REFERENCE SIGNS LIST 1 tank
2 high-pressure pump
3 disperser
4 heat exchanger
5 multi-step pressure reducer
6 return line
7 flow path switching valve (three-way valve)
10 dispersing system

The invention claimed is:

1. A method for producing a carbon nanotube dispersion liquid comprising
    a dispersing step of performing at least one cycle of dispersing treatment in which pressure is applied to a coarse dispersion liquid containing carbon nanotubes and a dispersion medium, the coarse dispersion liquid is fed under pressure, and shear force is applied to the coarse dispersion liquid, and
    repeating the dispersing step for a plurality of repetitions, wherein the number of repetitions is 3 or more,
    the pressure applied to the coarse dispersion liquid is alternately increased and decreased between repetitions of the dispersing step, and
    in at least one instance, the pressure applied to the coarse dispersion liquid is altered by at least 10 MPa between consecutive repetitions of the dispersing step.

2. The method for producing a carbon nanotube dispersion liquid of claim 1, wherein
    the carbon nanotubes have an average diameter (Av) and a diameter standard deviation ($\sigma$) that satisfy a relationship $0.20<(3\sigma/Av)<0.60$.

3. The method for producing a carbon nanotube dispersion liquid of claim 1, wherein
    the carbon nanotubes have a BET specific surface area of at least 600 $m^2/g$.

4. A method for producing a composite material composition comprising
    a step (W) of obtaining the carbon nanotube dispersion liquid by the method for producing a carbon nanotube dispersion liquid of claim 1, and
    a step (X) of mixing a polymer material-containing liquid with the carbon nanotube dispersion liquid obtained in step (W).

5. A method for producing a composite material comprising
    a step (Y) of solidifying a composite material composition obtained by the method for producing a composite material composition of claim 4.

* * * * *